United States Patent
Pei et al.

(10) Patent No.: US 9,015,817 B2
(45) Date of Patent: Apr. 21, 2015

(54) RESILIENT AND RESTORABLE DYNAMIC DEVICE IDENTIFICATION

(71) Applicant: Symantec Corporation, Mountain View, CA (US)

(72) Inventors: Mingliang Pei, Mountain View, CA (US); Liyu Yi, Fremont, CA (US); Ajay Ramamurthy, Santa Clara, CA (US); Mark Chan, Mountain View, CA (US); Salil Sane, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 198 days.

(21) Appl. No.: 13/856,352

(22) Filed: Apr. 3, 2013

(65) Prior Publication Data

US 2014/0304786 A1    Oct. 9, 2014

(51) Int. Cl.
*G06F 15/16*    (2006.01)
*H04L 29/06*    (2006.01)
*G06F 17/30*    (2006.01)
*G06F 21/44*    (2013.01)
*H04L 9/32*    (2006.01)
*H04N 7/167*    (2011.01)

(52) U.S. Cl.
CPC .......... *G06F 21/44* (2013.01); *H04L 63/0876* (2013.01); *H04L 63/0807* (2013.01)

(58) Field of Classification Search
CPC ....... G06F 21/31; G06F 21/44; H04L 63/083; H04L 63/08; H04L 63/102; H04L 63/0815; H04L 63/0876
USPC .......... 713/168–174, 182–186, 202; 709/206, 709/225, 229, 249, 389; 726/2–8
See application file for complete search history.

(56) References Cited

U.S. PATENT DOCUMENTS

2014/0244387 A1 *   8/2014   Patton et al. ............... 705/14.53
2014/0282929 A1 *   9/2014   Tse ................................. 726/5

* cited by examiner

*Primary Examiner* — Evans Desrosiers
(74) *Attorney, Agent, or Firm* — Lowenstein Sandler LLP

(57) ABSTRACT

A computer system receives a request to access a server. The request includes a first device tag set. When the first device tag set matches a previously assigned device tag set, the computer system allows access to the server without requesting full access credentials of a user. The computer system invalidates the first device tag set, and sends a second device tag set. When the first device tag set does not match the previously assigned device tag set, the computer system requests full access credentials from the user.

12 Claims, 5 Drawing Sheets

RESILIENT AND RESTORABLE DYNAMIC DEVICE IDENTIFICATION

TECHNICAL FIELD

The present disclosure relates to device identification, and more particularly, to resilient and restorable dynamic device tags.

BACKGROUND

Enterprises can control user access to enterprise applications, such as web applications, by authenticating users via user credentials, such as a username and password. Enterprises may wish to provide a more secure environment by implementing two-factor authentication, which uses two or more authentication factors. The authentication factors include "something the user knows" (e.g., username, password, PIN, pattern), "something the user has" (e.g., a device, a computer, a mobile phone, a physical card, a smartcard, an authentication token), and "something the user is" (e.g., a biometric characteristic such as a fingerprint or a unique retina). When a user accesses a website that uses two-factor authentication, the website might request a username and password ("something the user knows"). The website can also detect or receive identification data from a device that correlates the user with the device ("something the user has"). The website can identify the device using a device tag. Conventional approaches are vulnerable to attackers that intercept the device tag and copy it to another device. Such approaches leave users susceptible to identity theft and online fraud. Other conventional approaches can lose track of a known or authenticated device when device tags are lost, removed or deleted.

SUMMARY

In one implementation, a system for identifying a device using a device tag set is described. An example system may include a memory and a processing device that receives, via a network, a request to access a server. The request includes a first device tag set. When the first device tag set matches a previously assigned device tag set, the processing device allows access to the server without requesting full access credentials of a user, invalidates the first device tag set, and sends a second device tag set. When the first device tag set does not match the previously assigned device tag set, the processing device requests full access credentials from the user.

In one implementation, the first device tag set is one device tag. In a further implementation, the device tag includes a static portion and a dynamic portion. The dynamic portion has a first dynamic value. In another implementation, sending a second device tag set includes replacing the first dynamic value with a second dynamic value. In one implementation, invalidating the first device tag set includes invalidating the first dynamic value of the dynamic portion of the device tag. The first device tag set and the second device tag set can be part of a sequence of a plurality of device tag sets, and the second device tag set is next in the sequence after the first device tag set.

The first device tag set can include a plurality of device tags, and the processing device can include, in a web page, code that causes each of the plurality of device tags to be placed in a different storage location of the client device. The storage locations of the client device are accessible via an application installed on the client device. The processing device can receive a location map that indicates a location for each of the plurality of device tags. The processing device can also send the missing device tags when the location map indicates that a first predetermined number of the plurality of device tags are missing from the storage locations. The processing device can further request the full access credentials, when the location map indicates that a second predetermined number of the plurality of device tags are missing from the storage locations. In one implementation, the processing device can identify whether each of the plurality of device tags is in an expected storage location using the location map. The processing device can request the full access credentials from the user when the location map indicates that one of the plurality of device tags is not in an expected storage location. In one implementation, the processing device can receive an invalid first device tag set and can invalidate the second device tag set in view of the received invalid first device tag set.

Further, a method for identifying a device using a device tag set is described. A computer system implementing the method can receive, via a network, a request to access a server. The request includes a first device tag set. When the first device tag set matches a previously assigned device tag set, the method allows access to the server without requesting full access credentials of a user, invalidates the first device tag set, and sends a second device tag set. When the first device tag set does not match the previously assigned device tag set, the method requests full access credentials from the user.

In addition, a non-transitory computer readable storage medium for identifying a device using a device tag set is described. The non-transitory computer readable storage medium includes instructions that, when executed by a processing device, cause the processing device to receive, via a network, a request to access a server. The request includes a first device tag set. When the first device tag set matches a previously assigned device tag set, processing device allows access to the server without requesting full access credentials of a user. The processing device also invalidates the first device tag set and sends a second device tag set. When the first device tag set does not match the previously assigned device tag set, processing device requests full access credentials from the user.

In one implementation, when the first device tag set matches a previously assigned device tag set that is invalid, the server determines that the invalid first device tag set is a copy of a previously valid first device tag set. The server can invalidate any device tag sets associated with the first device tag set, including a second device tag set, and request full access credentials from a user.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and systems for providing resilient and restorable dynamic device identification, according to various implementations. When a user accesses a server (e.g., a server providing a website) for the first time with a particular client device, the client device is unknown to the website. The unknown status of the client device presents a risk to the website. For websites that use two-factor authentication, the website can require multiple authentication factors before allowing the user to access the website using the client device. Risk-based authentication techniques can use the context of the device as a second factor in two-factor authentication. After the website authenticates the access credentials, the website can send a device tag to the client device. The website can use the device tag to identify the device as a known client device when the client device accesses the website in the future. If the client device is a known or previously registered client device when it accesses the website, the request can be considered lower risk than for an unknown client device. For lower risk requests, risk-based authentication systems can request lower user and client device authentication.

The device tag can be dynamic and can change after each device validation. Previous device tags can be invalidated and a device tag tracking service can recognize the newest device tag. The newest device tag can be used to validate the client device. This helps to detect when a tag has been copied and used in another client device.

Figure 1:
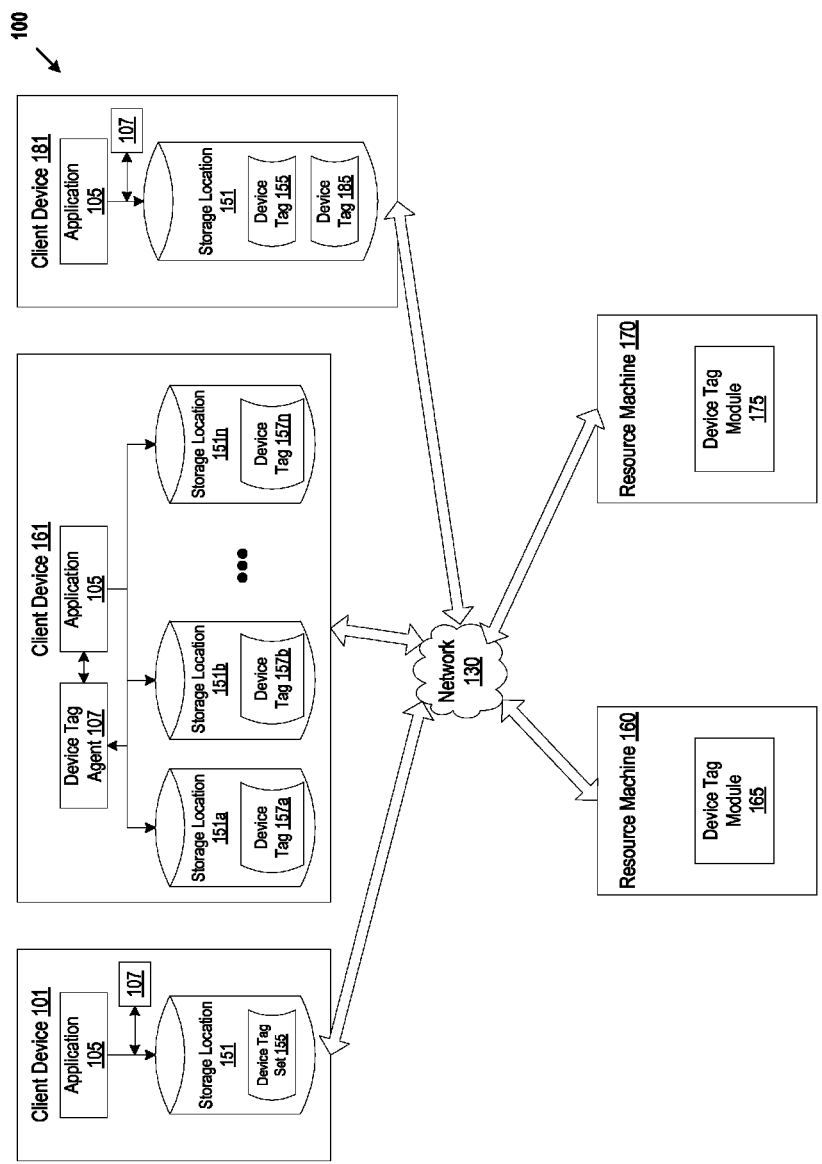
FIG. 1 illustrates example system architecture, in accordance with various implementations.

FIG. 1 is an example system architecture 100 in which implementations of the present disclosure can operate. System architecture 100 can include client devices 101,161,181 and resource machine 160,170, each having one or more network connections to connect to a network 130.

Resource machine 160, 170 may be one or more machines including one or more server computers, gateways or other similar computing devices connected to client device 101, 161,181 via the network 130. There can be any number of resource machines or servers in system architecture 100.

Resource machine 160,170 can provide Internet resources, such as webpages, to client device 101,161,181 via network 130. The resource machine 160, 170 can include a device tag module 165,175 that provides device tag provisioning and management functionality. Example functions of a device tag module 165,175 are described in further detail below in conjunction with FIG. 3. After authenticating a user and/or client device, resource machine 160,170 can generate and send a device tag set for the client device. Resource machine 160, 170 can receive and track the device tag set. When the resource machine 160,170 receives a later access request, for example, it can validate the device tag set and, if the set is valid, resource machine 160,170 can generate or assign a new set for the client device. If a device tag in the received device tag set is invalid, for example, resource machine 160,170 can invalidate the entire device tag set and all device tag sets associated with the client device, as discussed herein in further detail. When resource machine 160,170 provides a requested web page to client device 101, 161, 181, the device tag module 165, 175 can include, in the web page, code (e.g., javascript) that causes the client device 101, 161, 181 to store a new or updated device tag set 155 locally. For example, the javascript can instruct a web browser to store the device tag set 155 in client device 101,161,181. The client device 101, 161, 181 can provide the device tag set 155 to the resource machine next time the client device 101, 161, 181 sends an access request to the resource machine. The device tag module 165 can then use the device tag set 155 to identify the client device 101,161,181.

Device tag 155 can be used to identify a client device 101,161,181 when the client device interacts with a website, such as one provided by resource machine 160,170. Device tag 155 can provide an authentication factor for two-factor authentication, such as the "something the user has" authentication factor. One example of a device tag is a "cookie." Cookies can store user preferences, login credentials, authentication data, and device information, for example, that the website can use to identify the client device 101,161,181 during subsequent visits.

Client device 101,161,181 may be any electronic device with an application, such as a browser, or an application with browser-like capabilities, such as a desktop computer, a laptop computer, a server computer, a mobile phone (also referred to as cell or cellular phone), pager, personal digital assistant (PDA), wireless terminal, tablet, thin client, or another computer, gaming system, television, set-top box, DVD or Blu-Ray disc player, or another electronic device that has one or more network connections (either wireless or wired connections) to the network 130. There can be any number of client devices in system architecture 100.

In the depicted embodiment, the client device 101,161,181 includes one or more applications 105, device tag agent 107, one or more storage locations 151 and one or more device tag sets 155 received from resource machine 160,170. The application 105 may be a browser that renders media objects using URLs entered by a user or links activated by a user. The application 105 can retrieve data from the Internet, such as from resource machine 160,170, to render on the client device 101,161,181. When application 105 interacts with Internet websites or resource machine 160,170, the application 105 can store or cache data, content and information in one or more storage locations 151 of the client device 101,161,181.

Device tag agent 107 is communicably connected to application 105 and can receive and execute instructions from resource machine 160,170 regarding device tag sets 155,185. Device tag agent 107 can facilitate placing or setting device tags in storage location 151, for example. Device tag agent 107 can also identify storage locations 151 of device tags 155 and create a location map that specifies the storage locations 151 of the device tags 155. The location map can correlate a device tag with a storage location and can be in any format, such as a table, a matrix, etc. The location map can be sent to the resource machine 160,170 to be used in determining whether the device tags are in the correct or expected locations. The location map can indicate when a device tag is missing from a storage location or when a device tag is not in an expected storage location. Device tag agent can be part of application 105, can be a plug-in to application 105 or can be a stand-alone module or program.

The storage location 151 can be any location accessible by the application, application plug-in, browser or a browser plug-in. Storage location 151 can be an application-specific object store, such as a cookie store or a HTML5 storage location when the application is a browser. When multiple applications 105 are installed on client device 101,161,181, each application 105 can have its own storage location that is not shared with other applications 105. Storage location 151 can also be an object store of an application or browser plug-in that is shared across different application or browser types. One application plug-in, for example, can have its own data store that can be used for storing device tags. Device tags 155 can be stored in storage location 151 under web storage or document object model (DOM) storage methods and protocols, for example. Other examples of storage location 151 include local storage and session storage. Device tags stored in local storage can persist after the application 105 is closed. For session storage, the device tags last for the duration of a session and session storage can be cleared when application 105 is closed. Storage location 151 can include any number or combination of local, session, or other storage types. When javascript instructs a browser to store a device tag set, for example, the browser can direct the device tag set 155 into different categories of data stores or storage locations 151 in client device 101,161,181.

Network 130 provides a connection layer between client device 101,161,181 and resource machine 160,170 and can be a private or public network, or any combination thereof. For example, the network 130 may be a local area network (LAN), an intranet, an extranet, a cellular network, a paging network, the Internet, or any combination thereof. The network connections may be LAN connections, Internet connections, Wi-Fi connections, IEEE 802.11 connections, 3G connections, EDGE connections, CDMA, TDMA, GSM, 4G connections, LTE, LTE-Advanced, WiMAX, IEEE 802.15 Bluetooth connections, or other types of network connections, and may use various types of protocols to communicate data to and from the client device 101,161,181 and other devices connected to the network 130.

Figure 2:
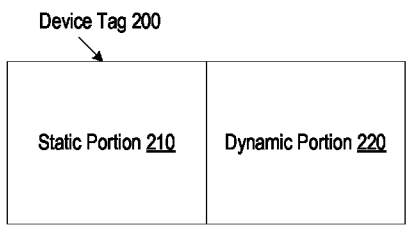
FIG. 2 is an illustration of an example device tag.
Figure 3:
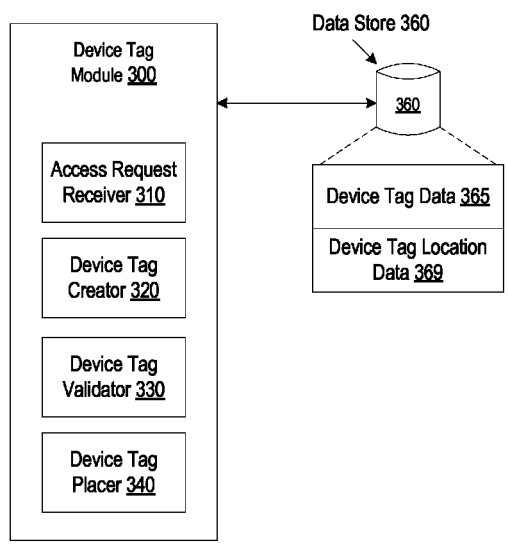
FIG. 3 is a block diagram of an implementation of a device tag module.

In one implementation, resource machine 160,170 generates a device tag set 155 that includes one or more dynamic device tags as described in further detail in conjunction with FIGS. 2 and 3. The resource machine 160,170 can generate the device tag set 155 after a user or client device is successfully authenticated, for example. At least one device tag in the device tag set 155 can have a dynamic value that can change upon each validation by the device tag module 165,175. When device tag module 165 receives a request to access a resource machine or server, device tag module 165 can determine whether the device tag set 155 associated with client device 101,161,181 matches a previously assigned device tag set. If yes, then device tag module 165 can assign and send a second device tag set 155 for client device 101,161,181. The second device tag set can be saved by the client. After assigning the second device tag set 155, device tag module 165 can designate the first device tag set as invalid and store a record of the invalid designation in a storage system. Invalidated device tag sets 155 can be deactivated and a newly assigned device tag set 155 can be recognized by device tag module 165 for subsequent server access requests. Deactivating an invalidated tag can also help device tag module 165 to detect whether a device tag in the device tag set 155 has been copied and used by another client device. When receiving two device tag sets 155, the device tag module 165 can determine that the later received device tag set 155 is a copy of the earlier received device tag set 155. For example, a deactivated device tag set could be received from an original, authenticated owner or from another entity who copied the device tag set. When a deactivated tag is received again all tags associated with the device can be deactivated. The dynamic nature of the device tag set 155 can provide pseudo device specific tags with a reduced window for misuse. Examples of dynamic device tags are described in further detail below in conjunction with FIG. 2.

In another implementation, resource machine 160,170 can enforce the use of the multiple device tags that can be stored in multiple storage locations of a client device. Resource machine 160,170 can instruct a client device 161 to store device tags (157a, 157b, . . . , 157n) in device tag set in a plurality of storage locations (151a, 151b, . . . , 151n). Device tags 157 can be the same or similar to device tags of device tag set 155. Resource machine 160,170 can use any one or subset of the device tags 157 to uniquely identify the client device 161. Storing a plurality of device tags 157 to a plurality of storage locations 151 can mitigate problems caused when device tags 157 are deleted, such as through clearing a browser cache. A user may remove one or more device tags 157 from their client device 161, either by accident or intentionally. The deletion of some device tags 157 does not adversely affect identification of the client device 161, provided that at least one device tag 157 is present in client device 161. The device tags 157 can be mutually recoverable—meaning each tag can be used to recover any missing or deleted device tags 157. For device tag recovery, resource machine 160,170 can store a list of related device tags 157, as described in further detail below in conjunction with FIG. 3. In some implementations, resource machine 160,170 can also keep track of the storage location of client device 161 where the device tags 157 are stored.

In a further embodiment, one or more device tags 157 can have filenames or values that appear to be not sensitive and less intrusive, which can help with client device protection, accurate device identification and device tag recovery. For example, a filename of a device tag can have a random string of alphanumeric characters that do not identify the website that sent the device tag. Users are less likely to remove such device tags. Further, such device tags are less likely to be stolen by a hacker.

In yet another implementation, system 100 can use device tags 155,185 that are associated with different resource providers, such as for two different domains. A domain can be a web domain, or a website URL, for example. Resource machine 160 can be a resource provider that hosts a first resource (e.g., a first web domain) while resource machine 170 can be a resource provider that hosts a second resource (e.g., a second web domain). The resource providers 160,170 can provide services for each other. When both domains create a different device tag set (e.g., 155, 185) for the same device, the device tag module can associate the two device tag sets from the different domains. The first web domain, for example, can be a photo sharing website and the second web domain can provide user authentication services for the photo sharing website. During device tag creation, the photo sharing website can include code (e.g., javascript) in its web page to set device tag 155 in client device 181 for the photo sharing website. In a specific implementation, Web_domain_A can embed an inline frame element (e.g., iframe) in its web page. An iframe can embed a document from one website within another website. An iframe in web_domain_A can include code that refers to web_domain_B within web_domain_A. A javascript in the iframe can place device tag 185 in storage location 151, where device tag 185 is for web_domain_B. In an example of using device tag sets from different domains, using client device 181, a user accesses a website, which uses a third party authentication service. After authenticating a user to access the photo sharing website, device tag module 165 can send a first device tag set 155 of the website and device tag module 175 can send a second device tag set 185 of the authentication service to client device 181. The website can use either device tag set 155 or device tag set 185 to identify the client device 181 on subsequent accesses. If the device tag set 155 for the website has been deleted, for example, device tag module 165 can use the device tag set 185 of the authentication service to identify the client device 181. Device tag set 155 and device tag set 185 can also be used to restore each other. If the device tag set 155 of the website is incomplete or missing, device tag module 165 can use the device tag set 185 of the authentication service to restore or create a new device tag set 155. Likewise, device tag module 175 of the authentication service can restore or create a new device tag set 155 of the website using the device tag set 185 of the authentication service.

FIG. 2 illustrates one implementation of a dynamic device tag 200. The device tag 200 may be a device tag in the device tag set 155 of FIG. 1. Device tag 200 can include a static portion 210 and a dynamic portion 220.

The static portion 210 can be a unique identifier or value that remains constant after each device authentication or identification. The static portion 210 can be used to identify the client device. For example, a device tag 200 for a specific client device has a static portion value of a13b02c99. Each new or updated device tag the client receives can have a static portion value of a13b02c99. When multiple device tags are sent to a client device, each device tag can have a unique static portion that remains constant after each device authentication or identification. Each device tag can also have the same static portion. The dynamic portion 220 can change each time the device tag is validated or identified. A new dynamic value is sent to the device and stored by device tag module 300, such as in device tag data 365, for future device identification.

The dynamic portion 220 can be in many forms that vary in security and complexity. A dynamic value 220 can be created such that it would be difficult to guess or ascertain the next dynamic value in a dynamic value sequence. If subsequent dynamic values in the sequence can be easily guessed, a malicious user can generate subsequent values and thereby spoof authentication. When the dynamic value sequence is a predictable pattern, encryption can be used on the device tag 200. Since a device tag module outside the client device verifies the device tag, the encryption key is not present on the client device and stays with the device tag module.

An example method for generating static and dynamic portions of a device tag can use an encrypted simple counter with a random salt value. A sample equation can be: D=Encrypt(S||counter||<random salt>), where "D"=device tag, "S"=a static value, "counter"=a counter value, "<random salt>"=a random salt value, and "||" indicates a string concatenation. Upon each validation of the device tag by a server, or by device tag module running on a server, the counter can increase by 1. A random salt value can be used such that the encrypted value cannot be used to guess the counter or replay from previously collected dynamic value by the user or a malicious user. The encryption is done by the server or device tag module that tracks the device tags. The encryption key is only known to the server. The server can track the current counter for the device tag. If a lesser counter value is found in a submitted device tag than what was last validated, the device tag is considered copied and the user can be challenged for additional authentication.

Another example method for generating a dynamic value can use a one-time password (OTP). An OTP is generally a password which is valid for one login session or transaction. The OTP may be generated by a security token. A server or a device tag module can generate an event-based OTP secret and associate the secret with the static value. The next OTP can be set to the dynamic value that the server or device tag module can track. The server or device tag module accepts the last known device tag. When a submitted dynamic value matches what the server knows for the device tag, the server can set new dynamic portion or set a new device tag in its data store. Client-side javascript can set the new dynamic value or set a new device tag in a storage location of the client device. Once an OTP is used, it becomes invalid and may not be used a second time. The dynamic value can be encrypted. A user may input the OTP manually (e.g., via a keyboard), when logging onto a computing system or the security token itself may provide the OTP to the computing system when the security token is coupled to the client device.

Another example method for generating a dynamic value of a device tag 200 can use a randomly generated value that a server or device tag module tracks. In this example, the server or device tag module accepts only the last known device tag 200. When a received dynamic value matches what the server knows for the device tag 200, the server can set a new one in its record. The server can also provide (e.g., embed in a web page) javascript to set the new value in one or more storage locations on the client device by replacing at least the dynamic portion of the device tag with the randomly generated dynamic value. Device tag 200 can be generated, updated and invalidated in various ways which are not intended to be limited to the examples described herein.

FIG. 3 is a block diagram of one implementation of a device tag module 300. The device tag module 300 may be the same as the device tag module 165 in a resource machine 160 of FIG. 1. In one implementation, the device tag module 300 resides outside the resource machine 160 and intercepts requests to access the resource machine 160. Device tag module 300 manages device tags and device tag sets that can uniquely identify client devices. Device tag module 300 can include access request receiver 310, device tag creator 320, device tag validator 330, and device tag placer 340. Device tag module 300 may include more or fewer components.

Access request receiver 310 can receive an access request from a client device to access an Internet resource, such as a website hosted by resource machine 160. The access request can include information about the client device, such as a device tag set associated with the client device. Alternatively, the device tag set can be provided separately from the access request from the client device. Access request receiver 310 can also request a device tag set from the client device when the client device attempts to access the website. Access request receiver 310 can use device tag data 365 to determine whether all the device tags in a device tag set are present. In one implementation, device tag module 300 can identify one or more storage locations on the client device. In this implementation, a client device can indicate a storage location and send it to the access request receiver. The access request receiver can then store it as device tag location data 369. For a subsequent access request, the access request receiver can compare location data of a second received set of device tags with device tag location data 369 to determine if device tags of the second received set are in the expected locations.

If the client device requesting access does not have a device tag set, then the device tag creator 320 can create a device tag set for the client device for future device identification and validation. Device tag creator 320 can create new device tag sets or updated existing device tag sets and assign them to a client device for future identification of the client device. Similarly, when a website does not receive a complete device tag set for the client device, device tag creator 320 can restore missing device tags or create a new device tag set for the client device. A device tag can be dynamic or have a dynamic portion, as described in further detail in conjunction with FIG. 2. Device tags can also be grouped in device tag sets. Device tags within the set can be directed to different storage locations or storage types of the client device. In an example, for each storage location or storage type, at least two device tags are created. Random and strong long identifier name value pairs $c_1=cv_1, c_2=cv_2, \ldots, c_m=cv_m$ can be generated for storage location, where $m>1$ and where "=" indicates a pairing between the two tags. The client set c1, c2, ..., cm can be sent to the client device and the paired set cv1, cv2, ..., cvm can be used by the device tag module 300 to validate the client set. A different set of identifiers h1=hv1, h2=hv2, ..., hn=hvn can be generated for HTML 5 storage where n>1 and where "=" indicates a pairing between the two tags. Likewise, the set h1, h2, ..., hn can be sent to the client device and the set hv1, hv2, ..., hvn can be stored by the device tag module 300. Device tags can also be associated with a specific website or domain. Decoy device tags, such as device tags with non-descriptive file names, can also be blended with each device tag set. Further, the device tags can be named generically so as to obfuscate information related to the device tag set and to not arouse the attention of the client device user. For example, instead of naming a device tag as "cookie:user@CorporationWebSite," the device tag filename can be "cookie:user@i491e009g155" or "cookie:user@photoediting."

If the device tag module 300 receives a device tag set from the client device, device tag validator 330 can determine whether the received device tag set is valid using device tag data 365, as described below. If device tag set is valid, then device tag module can identify the client device. Device tag validator 330 can validate the device tag set by determining whether it matches a previously assigned or paired device tag set. Continuing the example of paired sets from above, the received device tag set includes device tags c1, c2, c3. If the device tag set of device tag module 300 includes device tags cv1, cv2, cv3, the name value pair is a match and the device tag validator 330 validates the received device tag set. If the device tag set of device tag module 300 includes device tags dv1, dv2, dv3, the name value pair is not a match and the device tag validator 330 does not validate the received device tag set. Device tag validator 330 can also determine whether the received device tag set is valid using device tag location 369. In the paired sets example, even when the values of the received device tag set match those of the paired set, if the location of at least one of the device tags in the received set is incorrect, device tag validator 330 can decide that the received set is invalid. Device tag validator 330 can notify other components of device tag module 300 whether the received device tag set is valid. Device tag validator 330 can receive a subset of device tags of the device tag set and still validate the device tag set. Even when a subset of device tags is removed from the client device, it does not prevent successful client device identification. If the device tag module receives a portion of a device tag set from the client device, device tag validator 330 can determine whether the device tag set received by access request receiver 310 is valid. Device tag validator can 330 also require at least one device tag from a first device tag set c1, c2, ..., cm and at least one from a second set h1, h2, ..., hn to successfully validate the client device. Device tag validator 330 can inform device tag creator 320 of missing device tags such that device tag creator 320 can restore or create new device tags.

Device tag placer 340 can send a device tag set to a client device. Device tag placer 340 can also direct device tags to specific storage locations of the client device according to device tag location data 369.

Data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. Data store 350 can store device tag data 365, and device tag location data 369.

Device tag data 365 can includes any data or information related to the device tag set. A relationship between device tags can be stored as device tag data 365. When a device tag is invalidated and a new one created to replace it, the relationship between these device tags can be stored. A sequence of device tags can also be stored. Information about which device tag is current can also be stored. When multiple device tags are set in a device at a time, a relationship between these device tags can be stored as device tag data 365. Further, data that a device tag set is associated with a client device can be stored. When using device tag pairs for device identification, one set of the pair can be stored in device tag data 365 and queried to validate a matching or related pair on a client device. A relationship between a device tag set and a client device can also be stored.

Device tag location data 369 can include location data for each device tag set. When device tags are stored in multiple storage locations on a client device, device tag location data 369 can store the storage location of each device tag. When validating the client device, device tag location data 369 can be queried to check if the device tags of the client device are in the expected storage locations.

Device tag module can be used to determine if a device tag has been copied or transferred to another device. If a device tag is copied to another client device and validated, a new value for the device tag is set in the other client device. The new value is stored by device tag module 300 and the old value is invalidated. The next time the original client device enters a device identification routine, its device tag is found to be old and invalid. The device tag module 300 can consider the invalid device tag as being copied or stolen because a newer value should have overwritten the old value in the client device. The device tag module 300 can invalidate all device tags associated with this device tag, including the latest valid device tag set, thereby preventing further use of the updated device tag in the second client device. A user of the client device can be challenged for further authentication. Upon user authentication, a new device tag can be set in the original client device. This mechanism can limit the attack window of a stolen or copied device tag to the next authentication time from the original client device.

Figure 4:
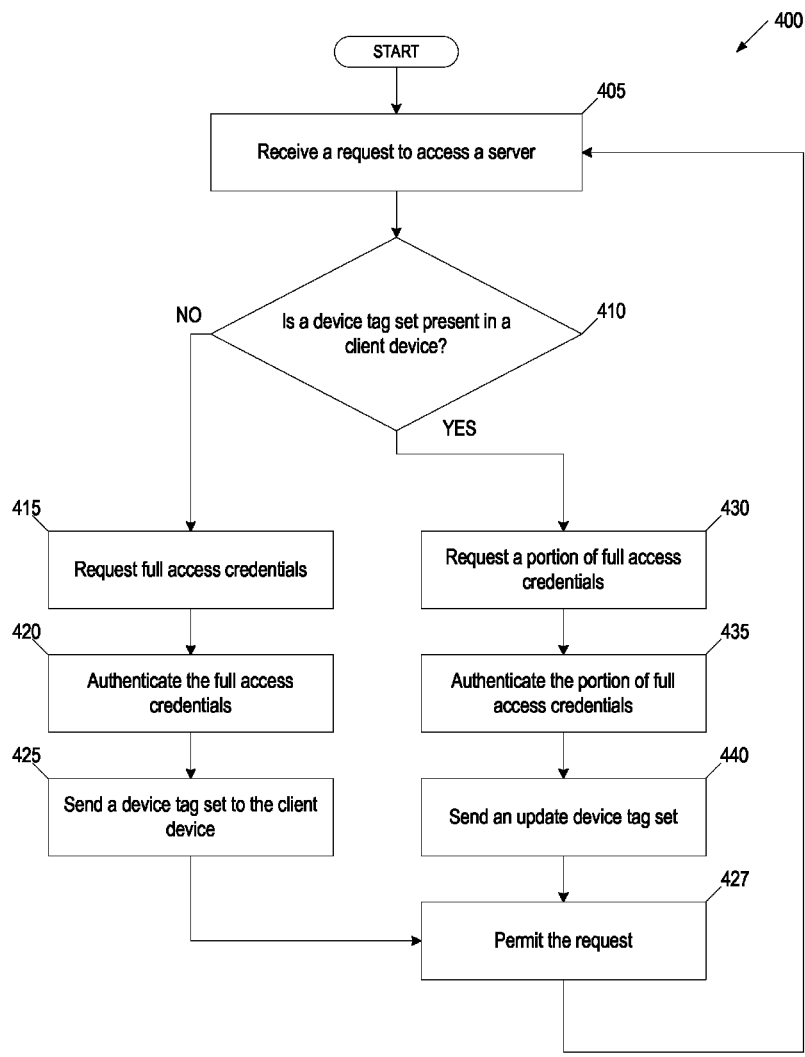
FIG. 4 is a flow diagram illustrating an implementation for a method for using a device tag set for device identification.

FIG. 4 is a flow diagram of an implementation of a method 400 for resilient and restorable dynamic device identification. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by device tag module 165 in server machine 160 of FIG. 1.

At block 405, processing logic receives a request from a client device to access a resource on a server (e.g., a website, domain). The request can include access credentials of a user (e.g., username, password) and of a device. The processing logic can request the access credentials from the requesting client device, such as when the processing logic does not receive access credentials with the request.

At block 410, processing logic can determine whether a device tag set is present in the client device. Processing logic can determine that the device tag set is present in the client device if it is included in the received request. Alternatively, processing logic can query the client device for the device tag set.

If the device tag set is not present, at block 415 processing logic can request full access credentials from a user of the client device. The full access credentials can include a combination of knowledge factors (e.g., username, password, PIN, pattern), possession factors, (e.g., a code sent to the device, one-time password, a device tag, a cookie, a token value), and inherence factors (e.g., human biometrics). For example, full access credentials can be a username, password and an expiring code sent to the client device.

At block 420, processing logic authenticates the received full access credentials. To authenticate the request, processing logic can query a data store for allowed combinations of access credentials. If authentication is successful, processing logic can assign and send a new device tag set to the client device at block 425. Processing logic can also store locally the device tag set assigned and sent to the client device. The device tag set can be one or more device tags to identify the client device in the future, as described herein. The processing logic can permit the request at block 427, thereby allowing the client device to access the server.

If at block 410, a device tag set is present in the client device, processing logic can request a partial access credentials at block 430. For example, when full access credentials include a username, password and an expiring code sent to the client device, partial access credentials can be the username and password and not the expiring code. In one implementation, after determining that the device tag set is present in the client device, processing logic can also determine if the received device tag set matches a previously assigned device tag set. If the device tag set matches the previously assigned device tag set, processing logic can allow access to the server without requesting full access credentials from a user of client device. If the device tag set does not match the previously assigned device tag set, device tag module can request full access credentials from the user of client device.

At block 435, processing logic authenticates partial access credentials. If authentication is successful, processing logic can create, assign and send an updated device tag set to the client device at block 440. Processing logic can also send an update to one or more device tags in the device tag set up to and including replacing the device tag set at the client device. Processing logic can invalidate the device tag set and assign and send a second device tag set to the client device. The processing logic can permit the request at block 427, thereby allowing the client device to access the server. In implementations, the second device tag can be the first device tag set in the subsequent access attempts of the user of client device.

Figure 5:
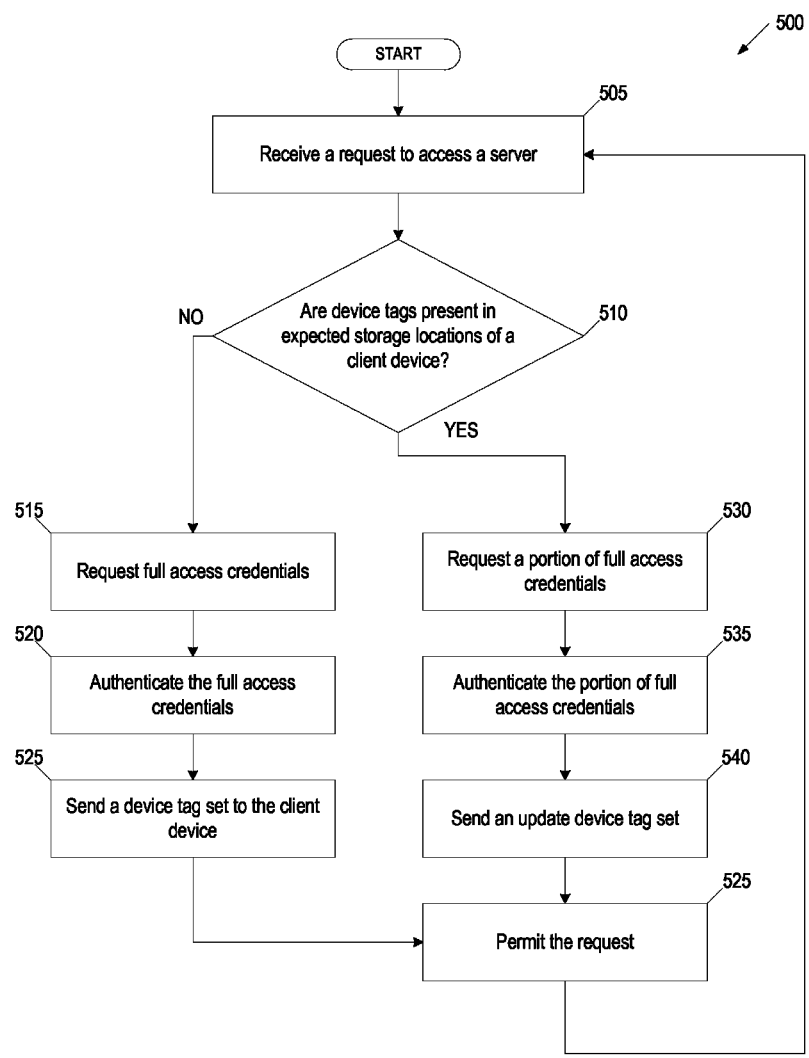
FIG. 5 is a flow diagram illustrating an implementation for a method for using a device tag set in a plurality of storage locations for device identification.

FIG. 5 is a flow diagram of another implementation of a method 500 for resilient and restorable dynamic device identification. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by device tag module 165 in server machine 160 of FIG. 1.

At block 505, processing logic receives a request from a client device to access a resource on a server (e.g., a website, domain). The request can include access credentials of a user (e.g., username, password) and of a device. The processing logic can request the access credentials from the requesting client device, such as when the processing logic does not receive access credentials with the request.

At block 510, processing logic can identify whether a device tag set is present in the client device and whether device tags within the device tag set are present in expected storage locations of the client device. Processing logic can receive an indication from the client device that the device tag set is present in expected storage locations of the client device as part of the request. The storage locations can be any storage location accessible by a browser, browser plug-in, or a client agent or application installed on the client device, as described herein. Processing logic can also query the client device for a location map of the different storage locations and the device tags sets stored in each storage location. By receiving this location map, and comparing it to a previously received location map, processing logic can determine whether device tags are in the expected storage locations. Processing logic can also detect whether a device tag set accompanied the access request.

If the device tag set is not present in the expected storage locations, at block 515 processing logic can request full access credentials from a user of the client device, as described herein.

At block 520, processing logic authenticates the received full access credentials. If authentication is successful, processing logic can assign and send a device tag set to the client device at block 525 where device tags can be set in different storage locations of the client device. Processing logic can also keep track of the device tag set assigned and sent to the client device. Processing logic can also keep track of the storage locations of device tags by receiving the location map from the client device. When assigning the device tag set to the client device, processing logic can indicate storage locations where the device tags should be placed. The client device can also place the device tags in any available storage location, which are then reported to the processing logic. In such an example, processing logic can receive the storage locations after the device tags of the device tag set have been placed by the client. The processing logic can permit the request at block 527, thereby allowing the client device to access the server.

If at block 510, processing logic identifies that a device tag set is present in the expected storage locations of the client device using the location map from the client device, processing logic can request a portion of full access credentials at block 530. For example, when full access credentials include a username, password and an expiring code sent to the client device, a portion of the full access credentials can be the username and password and not the expiring code. In one implementation, after identifying that the device tag set is present in the expected storage locations of client device using the location map from the client device, processing logic can also determine if the received device tag set matches a previously assigned device tag set. If the device tag set matches the previously assigned device tag set, device tag module can allow access to the server without requesting full access credentials from a user of client device. If the device tag set does not match the previously assigned device tag set, device tag module can request full access credentials from the user of client device. Processing logic can permit a grace time window and number of allowed retries before it requests the full access credentials from the user of the client device.

At block 535, processing logic authenticates the portion of full access credentials. If authentication is successful, processing logic can assign and send an updated device tag set to the client device at block 540. Processing logic can also send an update to one or more device tags in the device tag set up to and including an instruction to the client device to replace the device tag set at the client device. If device tags from some storage locations are missing, processing logic can send replacement or new device tags to those storage locations and instruct the client device to place the new device tags. Processing logic can also invalidate the device tag set and assign and send a second device tag set to the client device. The processing logic can permit the request at block 527, thereby allowing the client device to access the server.

Figure 6:
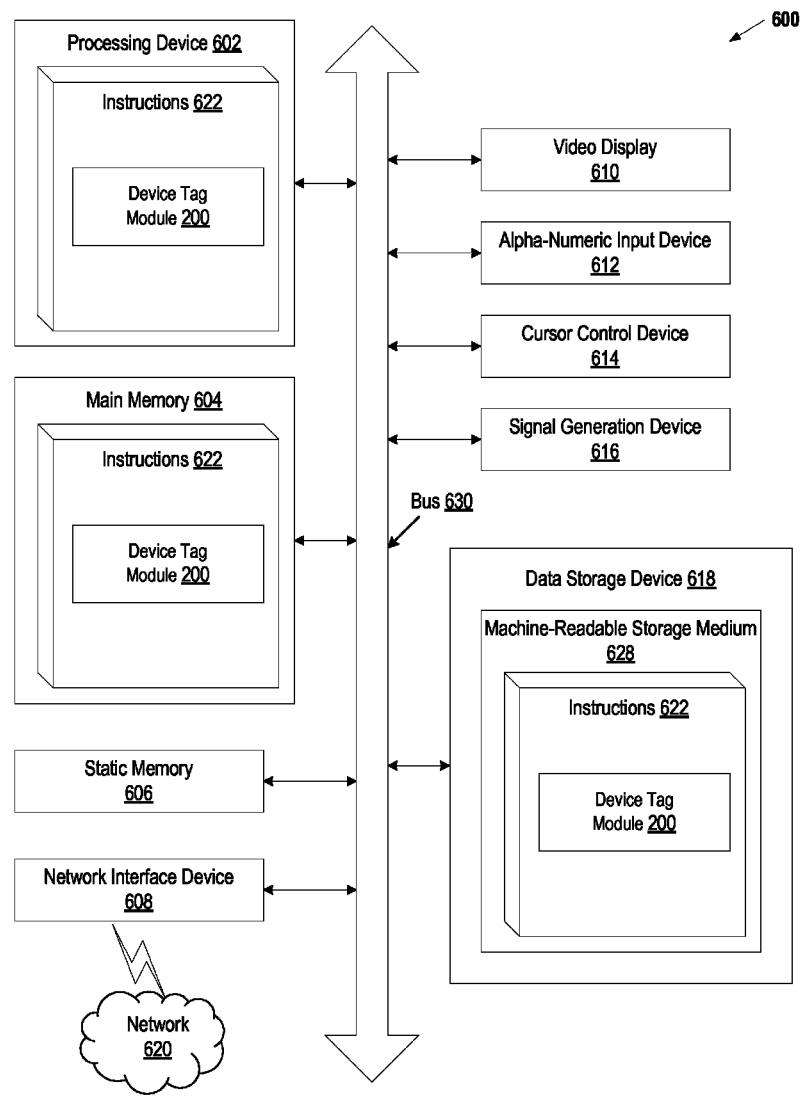
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions 622 or software embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a device tag module (e.g., device tag module 300 of FIG. 3) and/or a software library containing methods that call modules in a device tag module. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "sending" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method, comprising:
receiving, via a network, a request to access a server, the request comprising a first device tag set that comprises a device tag, the device tag having a static portion and a dynamic portion, wherein the dynamic portion has a first dynamic value;
when the first device tag set matches a previously assigned device tag set,
allowing access to the server without requesting full access credentials of a user,
invalidating the first device tag set, and
replacing the first dynamic value with a second dynamic value; and
when the first device tag set does not match the previously assigned device tag set, requesting full access credentials from the user.

2. The method of claim 1, wherein invalidating the first device tag set comprises invalidating the first dynamic value of the dynamic portion of the device tag.

3. The method of claim 1, wherein:
the first device tag set comprises a plurality of device tags, and
the method further comprises including, in a web page, code that causes each of the plurality of device tags to be placed in a different storage location of a client device, wherein the storage locations of the client device are accessible via an application installed on the client device.

4. The method of claim 3 further comprising:
receiving a location map that indicates a location for each of the plurality of device tags;
when the location map indicates that a first predetermined number of the plurality of device tags are missing from the storage locations, sending the missing device tags; and
when the location map indicates that a second predetermined number of the plurality of device tags are missing from the storage locations, requesting the full access credentials.

5. The method of claim 3 further comprising:
receiving a location map that indicates a location for each of the plurality of device tags; and
when the location map indicates that one of the plurality of device tags is not in an expected storage location, requesting the full access credentials from the user.

6. A system, comprising:
a memory; and
a processing device coupled with the memory to:
receive, via a network, a request to access a server, the request comprising a first device tag set that comprises a device tag, the device tag having a static portion and a dynamic portion, wherein the dynamic portion has a first dynamic value;
when the first device tag set matches a previously assigned device tag set, allow access to the server without requesting full access credentials of a user,
invalidate the first device tag set, and
replace the first dynamic value with a second dynamic value; and
when the first device tag set does not match the previously assigned device tag set, request full access credentials from the user.

7. The system of claim 6, wherein invalidating the first device tag set comprises invalidating the first dynamic value of the dynamic portion of the device tag.

8. The system of claim 6, wherein:
the first device tag set comprises a plurality of device tags, and the processing device further to:
include in a web page, code that causes each of the plurality of device tags to be placed in a different storage location of a client device, wherein the storage locations of the client device are accessible via an application installed on the client device.

9. The system of claim 8, the processing device further to:
receive a location map that indicates a location for each of the plurality of device tags;
when the location map indicates that a first predetermined number of the plurality of device tags are missing from the storage locations, send the missing device tags to the client device; and
when the location map indicates that a second predetermined number of the plurality of device tags are missing from the storage locations, request the full access credentials.

10. A non-transitory computer readable storage medium including instructions that, when executed by a processing device, cause the processing device to:
receive, via a network, a request to access a server, the request comprising a first device tag set that comprises a device tag, the device tag having a static portion and a dynamic portion, wherein the dynamic portion has a first dynamic value;
when the first device tag set matches a previously assigned device tag set, allow access to the server without requesting full access credentials of a user,
invalidate the first device tag set, and
replace the first dynamic value with a second dynamic value; and
when the first device tag set does not match the previously assigned device tag set, request full access credentials from the user.

11. The non-transitory computer readable storage medium of claim 10, wherein:
the first device tag set comprises a plurality of device tags, and the processing device further to:
include, in a web page, code that causes each of the plurality of device tags to be placed in a different storage location of a client device, wherein the storage locations of the client device are accessible via an application installed on the client device.

12. The non-transitory computer readable storage medium of claim 11, the processing device further to:
receive a location map that indicates a location for each of the plurality of device tags;

when the location map indicates that a first predetermined number of the plurality of device tags are missing from the storage locations, send the missing device tags; and when the location map indicates that a second predetermined number of the plurality of device tags are missing from the storage locations, request the full access credentials.

* * * * *